Sept. 29, 1964  O. P. STERNER  3,150,585
SEMI-AUTOMATIC STRAPPING APPARATUS
Filed July 18, 1961  5 Sheets-Sheet 1
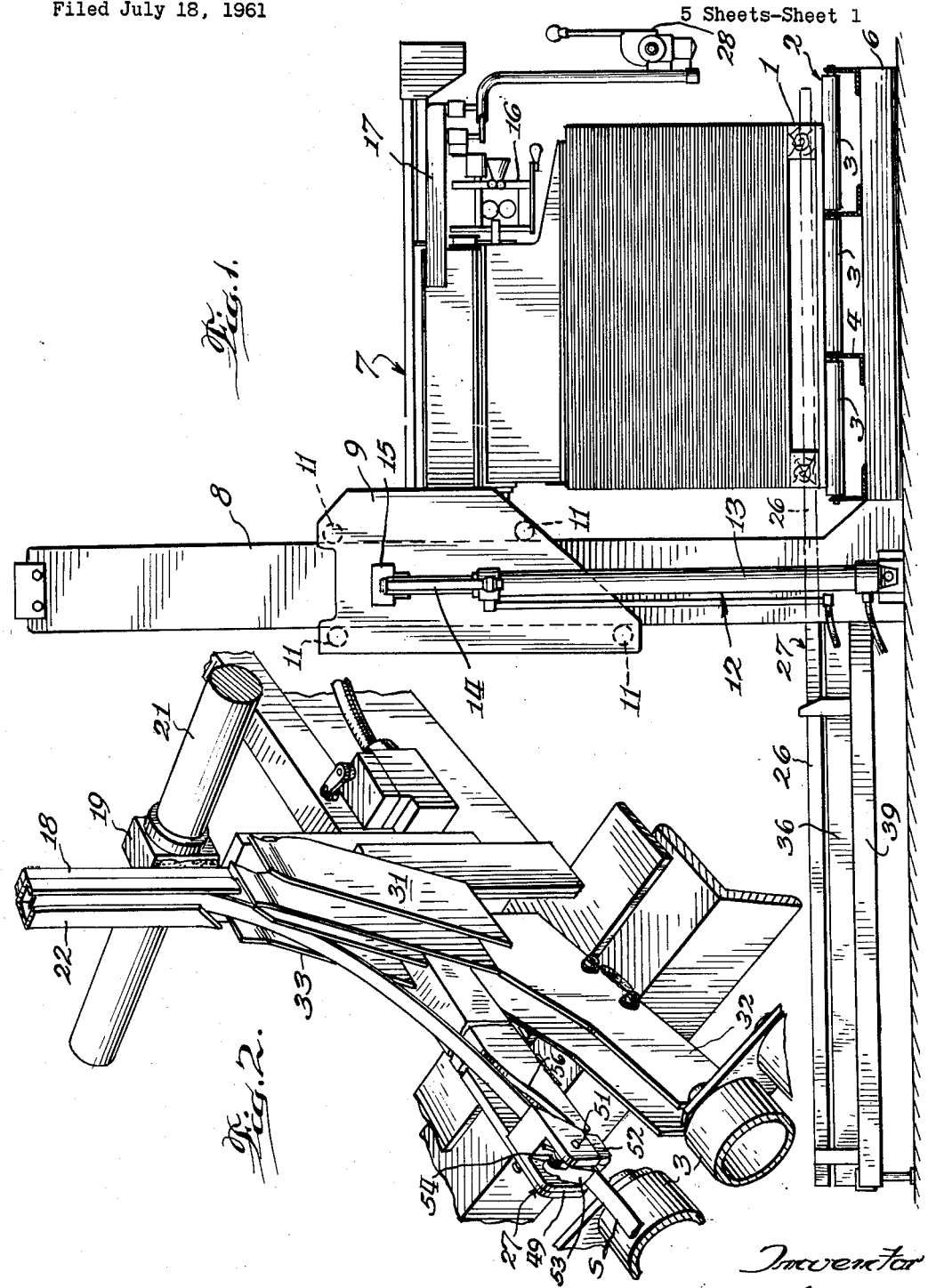
Inventor
Olle P. Sterner
By Schneider, Dressler, Goldsmith & Clement
Attorneys.

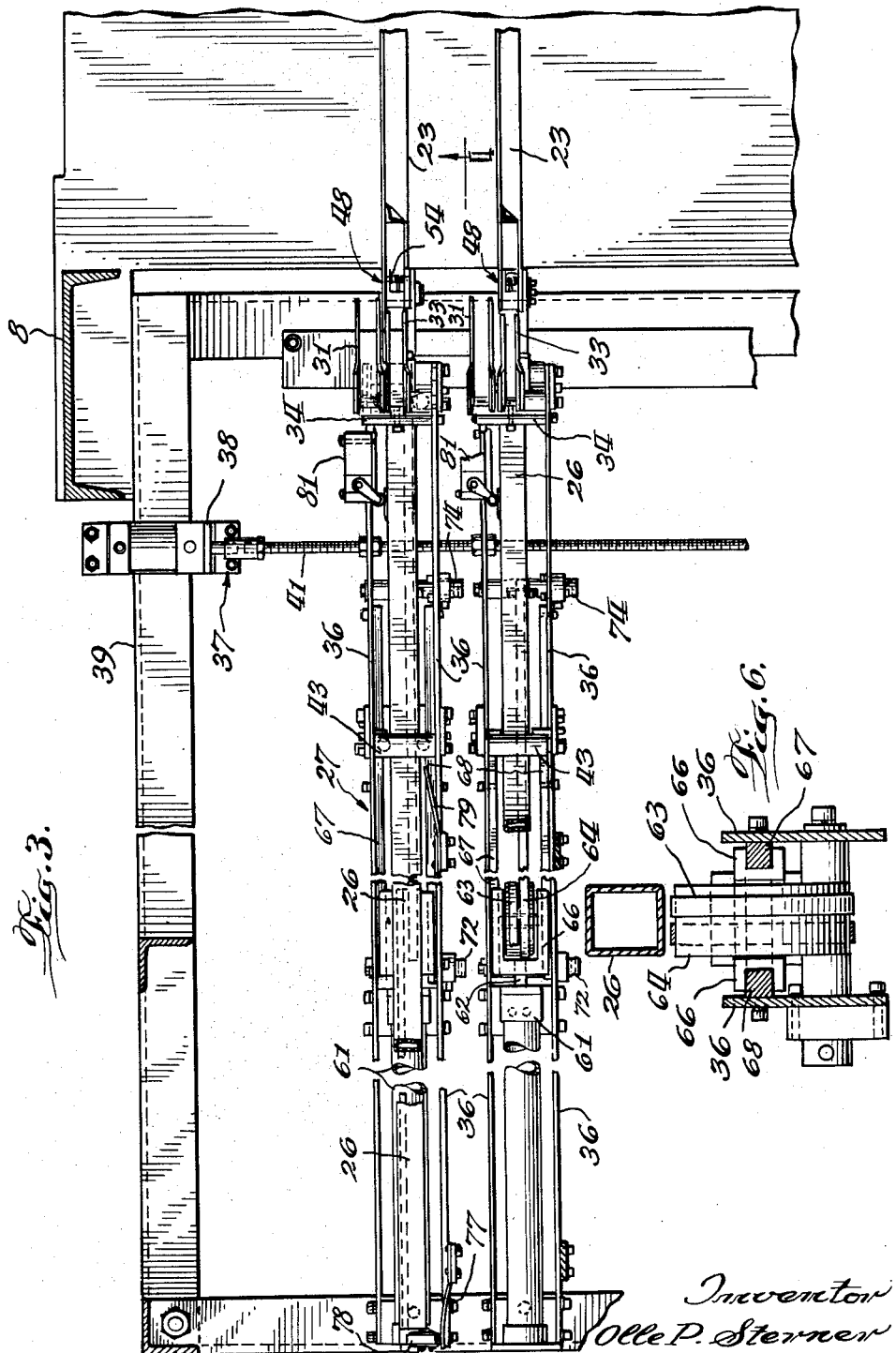

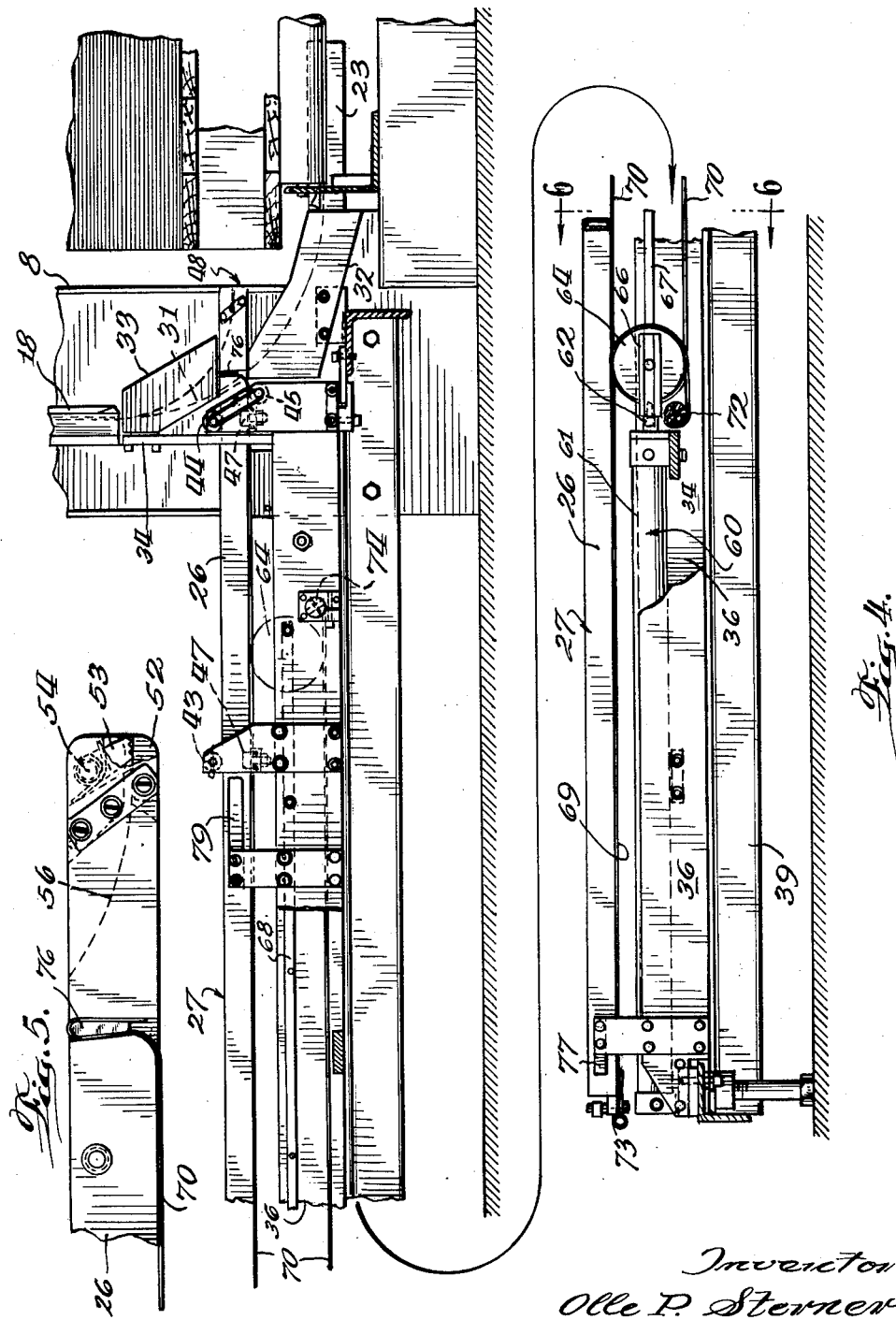

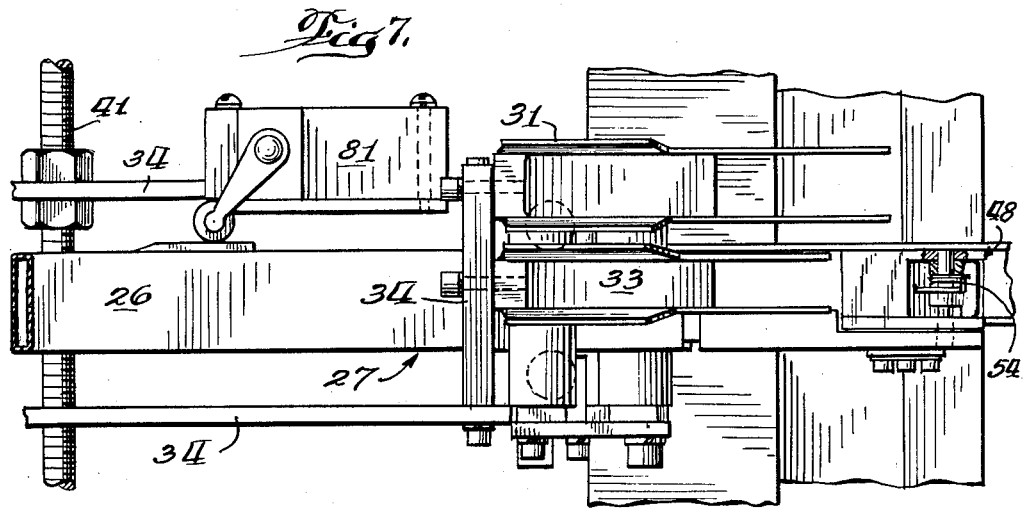
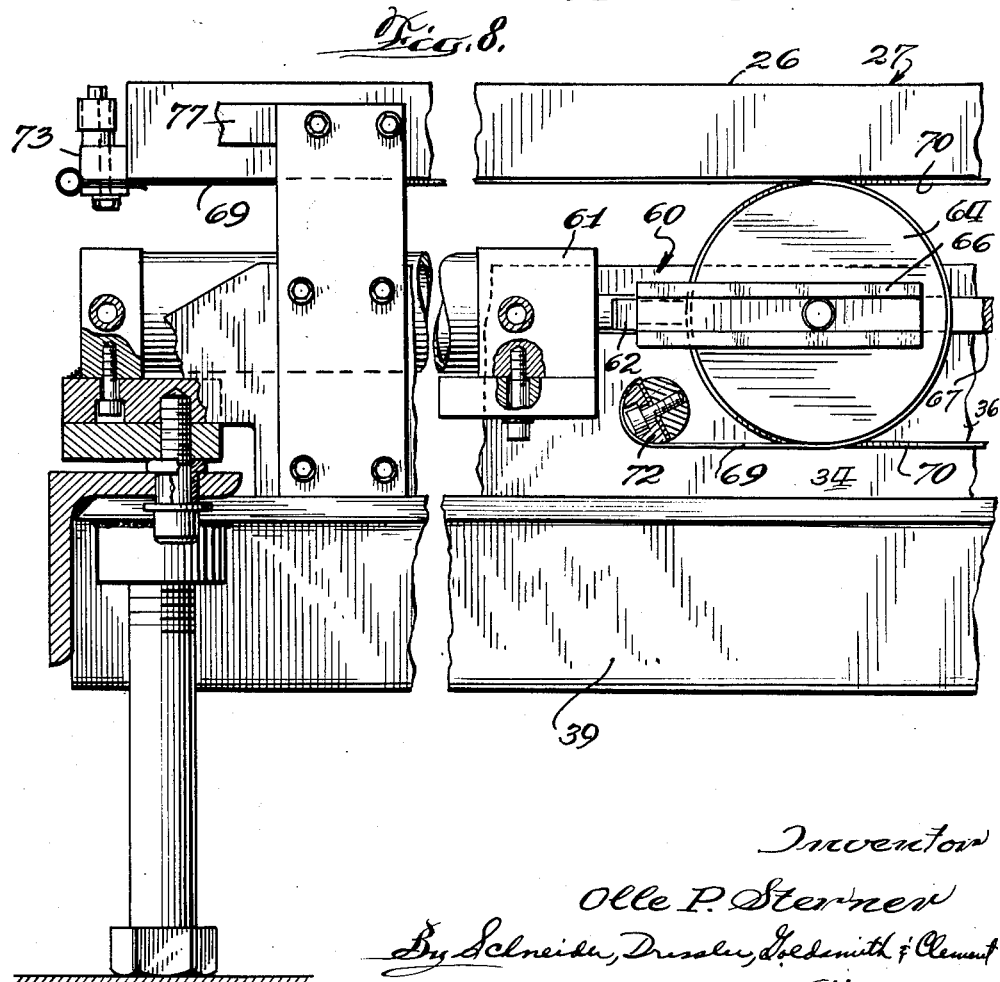

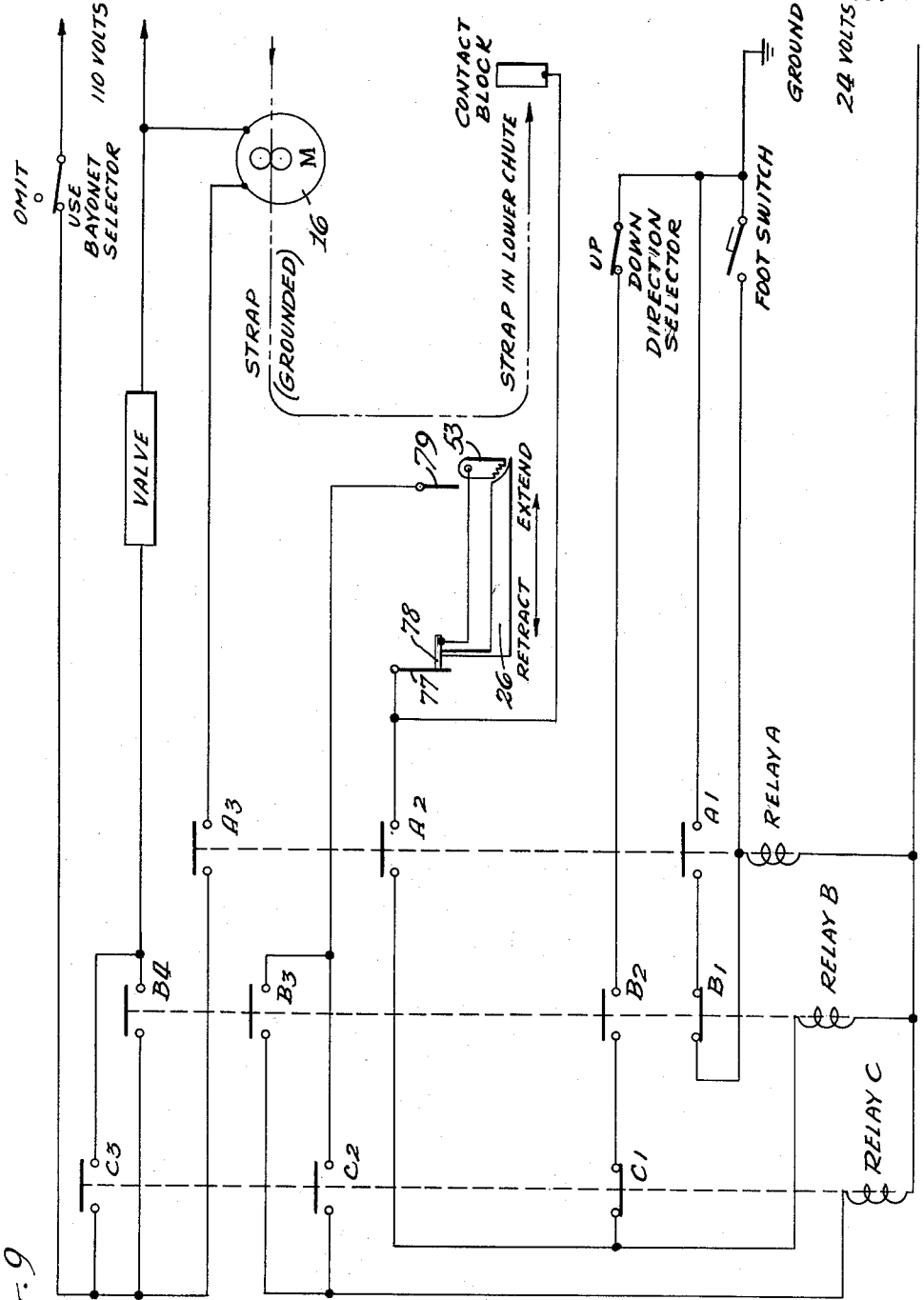

United States Patent Office 3,150,585
Patented Sept. 29, 1964

1

3,150,585
SEMI-AUTOMATIC STRAPPING APPARATUS
Olle P. Sterner, Park Ridge, Ill., assignor to Signode Steel Strapping Co., a corporation of Delaware
Filed July 18, 1961, Ser. No. 124,850
6 Claims. (Cl. 100—25)

This invention relates to an apparatus for strapping loaded pallets, particularly to a strapping press assembly which will automatically direct strap around and through a closed-bottom pallet to a position where the strap can be placed into a sealing tool.

Securing a load to a pallet by a steel strap has heretofore been primarily a manual operation in which the strap has been looped around the load and pallet and the ends placed in a strapping tool which was then operated to tension and seal the strap in position. This method of strapping was cumbersome and time-consuming and subsequently expensive due to the labor costs involved in strapping a pallet in this manner. The application of strap to load mounted on pallets made up of spaced parallel plates which requires some means for guiding the strap through the void formed between the plates presented additional problems. With this type of pallet, which will be referred to as a closed-bottom pallet, it was necessary to insert a guide chute longitudinally through the void between the pallet plates to provide a passageway for the strap. The strap was then directed around the load and through the inerted strap chute to where a portable tensioning and sealing tool could tension and seal the ends of strap. After the pallet was strapped, the chute had to be removed from the pallet to permit the strapped pallet to be moved to a storage area.

In accordance with the present invention, there is provided a strapping apparatus which will automatically direct a strap around the top and side of a loaded pallet and also through the closed bottom of a pallet to a position where the strap can be inserted into a tensioning and sealing tool for connecting the strap ends into a tension resisting joint. The automatic feeding of the strap through the void in the closed-bottom pallet is accomplished by an extendable and retractable bayonet gripper mechanism. The bayonet gripper is automatically moved through the void in the pallet when the strap enters the gripper mechanism and will automatically retract when the strap is removed therefrom.

Also, as part of the strapping apparatus, there is provided a platen arrangement which will operate to compress the loaded pallet prior to strapping the load to insure that a tight package is obtained. The metal strap is directed through the strap guide arrangement by a conventional strap feeder located in the area of the platen assembly. The strap feeder receives the strap from a dispenser located near the feeder. The dispenser is positioned so that it is accessible to the operator so that the section of the strap adjacent the feeder can be placed in a strapping tool to tension and seal the ends of the strap.

The mechanism incorporating the invention covered by this application provides an automatic arrangement for directing strap around three sides of a loaded pallet to a position where it can be manually inserted into a strapping tool for completing the strapping operation. The extension and retraction of the mechanism employed to direct the strap through the void in a closed-bottom pallet is controlled by an automatic system which thus only necessitates the use of one operator to do that which formerly required two or more operators.

The structure by means of which the above-noted and other advantages of the invention are attained is fully described in the following specification, taken in conjunction with the accompanying drawings, in which:

FIGURE 1 is a side view of the strapping apparatus with the bayonet gripper shown in the extended position to direct a strap through the void of a closed-bottom pallet;

FIGURE 2 is a partial perspective view showing a strap clamped in place in a bayonet gripper;

FIGURE 3 is a partial plan view of the apparatus showing a pair of bayonets in the retracted position;

FIGURE 4 is an enlarged view taken along lines 4—4 of FIGURE 3;

FIGURE 5 is an enlarged side view of one end of the bayonet gripper;

FIGURE 6 is a scectional view taken along lines 6—6 of FIGURE 4;

FIGURE 7 is an enlarged plan view of the front end of the bayonet unit;

FIGURE 8 is an enlarged plan view of the rear end of the bayonet unit; and

FIGURE 9 is a diagrammatic view of the controls and circuit for the strapping apparatus.

Referring first to FIGURE 1, there is illustrated a loaded closed-bottom pallet 1 in place on a roller conveyor 2 made up of three rows of rollers 3 supported on frame members 4 that are secured to a base support 6. To insure that a tight bundle is formed during the strapping operation, the load is compressed prior to strapping by an adjustably mounted platen, which is part of an overhead assembly 7. To accommodate loads of various heights, the overhead assembly 7 is slidably mounted relative to support columns 8 (only one of which is shown) located on both sides of the roller conveyor 2. The structure for supporting the overhead assembly 7 relative to each column 8 includes a box-like structure 9 that has one side rigidly connected to the overhead assembly 7 and its other side slidably mounted relative to the columns 8 by rollers 11. The vertical adjustment of the overhead assembly 7 is accomplished, for example, by a hydraulically operated piston and cylinder assembly 12 located adjacent each column. The cylinder 13 is pinned to the base support 6 and a rod 14 secured to the piston in the cylinder 13 is connected at bracket 15 to the slidably mounted box structure 9. Thus, the application of fluid under pressure to the under side of the hydraulic piston will raise the overhead assembly 7 to admit a loaded pallet to the conveyor 2 for strapping or permit removal of the strapped pallet to a storage area, and the application of fluid under pressure to the other side of the piston will urge the overhead assembly downward to compress the load disposed on the pallet.

Mounted in the overhead assembly 7 is a feeder unit 16 which receives the strap S from a dispenser 17 located above the feeder unit 16. The feeder 16 directs strap through a guide chute in the overhead assembly (not shown) and down a side strap chute 18 disposed parallel to the column 8 (see FIGURE 4). The vertical strap chute 18 is welded at its lower end to a collar 19 which is secured to a transverse support shaft 21 that is connected at its ends to the columns 8. The strap chutes in question are generally rectangular and include a resiliently mounted gate 22 that will open to release the strap when it is tensioned about the loaded pallet. The details of the strap chute are not important to an understanding of the present invention. However, it is noted that a detailed disclosure of a strap chute that could be used is disclosed in patent application Serial No. 124,989, which was filed in the name of the present inventor and assigned to the assignee of the present invention.

If a load is to be strapped to a pallet consisting of a single platform mounted on four legs, the strap is directed through a closed lower strap chute 23 that is fixed in place between the rollers 3 of the conveyor 2. This type of pallet is generally referred to as an "open-bottom" pallet. The lower strap chute 23 is similar in construction to the top and side chute sections previously described. When a closed-bottom pallet is to be strapped, a bayonet 26 is employed for directing the strap through the void between the pallet plates. The bayonet 26 is extended and retracted by a hydraulically operated pulley and band arrangement that is located within the bayonet support assembly 27. The details of this latter arrangement will be discussed hereinafter.

After the strap is extended under or through the pallet as above described, the strapping operation is completed by an operator who takes the strap from the end of the bayonet 26 or the outlet of the lower fixed chute 23 and places it into a strapping tool 28. The tool 28 provided for this purpose is pivotally mounted from the overhead assembly 7 and is moved into position immediately adjacent the strapped load when the strap is to be tensioned and sealed. The end of the strap adjacent the feeder 16 is then drawn down by the operator and placed in the strapping tool 28 in an overlapping relationship with the strap end received from under the loaded pallet. These two portions of the strap are then moved relative to each other to tension the strap about the loaded pallet. A seal is then secured to the tensioned strap loop to retain the strap in place. The details of the strapping machine are not important to an understanding of the present invention. A machine of the type that could be used is disclosed in Childress Patent No. 2,594,397, which patent is assigned to the assignee of the present invention. There can be as many straps applied to the load as desired. For each strap, there would be provided a separate feeder and strap guide assembly. In the instant case, there are two illustrated, but this is intended to be merely representative and not limiting.

When an open-bottom pallet is to be strapped, an open chute curve 31 is located between the vertical strap chute 18 and a chute curve 32 leading to the lower strap chute 23 (see FIGURES 2 and 4). When a closed-bottom pallet is to be strapped, the chute curve is moved sideways and is replaced with open chute curve 33. As shown in FIGURE 2, the chute 33 is shorter than the chute 31 by the amount necessary to make room for the longitudinally movable gripper unit. The two chute curves 31, 33 are secured to a mounting bracket 34 that is fastened at its ends to side plates 36 of the bayonet support assembly 27 (see FIGURE 3).

As illustrated in FIGURE 3, the chute curves 31, 33 are positioned relative to the vertical strap chute 18 by a hydraulically operated shifter mechanism 37. The shifter mechanism includes a cylinder 38 secured to the frame member 39 and a piston actuated shifter rod 41 that is connected to the bayonet guide side plate 36. The stroke length of the piston determines the shifting movement of the bayonet assembly 26. Suitable controls are provided to operate the shifter mechanism to accommodate the type of pallet being strapped.

Referring now to the strapping of a closed-bottom pallet, it is again noted that the strap is moved through the void in the pallet by the bayonet 26. The bayonet 26 consists of a longitudinally extending hollow rectangular member that is supported relative to the bayonet support assembly 27 at longitudinally spaced points by support rollers 43, 44, 45. The support rollers 43, 44, 45 guide the bayonet in the vertical plane and side rollers 47 are provided to support the bayonet against transverse movement. At one end of the bayonet, there is located a gripper unit 48 made up of gripper side plates 49, 51, a gripper bottom plate 52, and a toothed gripper 53 which is biased downwardly by the torsion spring 54. The portion of the bayonet immediately behind the gripper unit is cut out to form a strap guide 56 to direct the strap S received from the strap curve 33 into clamping engagement between the gripper 53 and gripper bottom plate 52.

The bayonet is moved longitudinally back and forth through the void in the closed-bottom pallet by the hydraulically operated mechanism 60. The mechanism 60 consists of a hydraulic cylinder 61 which positions a piston rod 62 that in turn longitudinally moves a pair of interconnected adjacent pulley portions 63, 64. The pulley portions 63, 64 are rotatably mounted in a crosshead 66 that is secured to the piston rod 62. As can be seen in FIGURE 6, the crosshead 66 is slidably mounted relative to the bayonet support assembly 27 by guide rails 67, 68 that are secured to the bayonet side plates 36. The movement of the pulleys 63, 64 is transferred to the bayonet 26 by bands 69, 70. Band 69 which functions to move bayonet 26 through the void in the pallet extends around pulley 63 and is connected at one end to the take-up reel 72 and at its other end, to a band clamp and wrapper pin 73 secured to the rear end of the bayonet 26. The band 70, which is the bayonet return band, is disposed around pulley 64 and is connected at one end to the return band take-up reel 74 and at its other end, to the forward end of the bayonet 26 where it is held in place by a hold-down clamp 76 (see FIGURE 5). Thus, it can be seen that outward movement of the piston rod 62 relative to cylinder 61 will move pulley 63 and band 69 to move bayonet 26 through the void in the closed-bottom pallet, and movement of piston rod 62 in the opposite direction will retract bayonet 26 through the action of pulley 64 and return band 70.

The operation of the hydraulic cylinder 61 is controlled by a solenoid operated valve (not shown). This valve is part of a control system which determines the operation of the various mechanisms previously described. The specific details of the control circuit are not critical to the present invention since many types of controls could be employed.

Briefly, the general operation of the control system for extending and retracting the bayonet is as follows:

The feeder 16 is first actuated to feed strap down chute 18 into the bayonet gripper unit 48 between the gripper head 53 and the gripper bottom plate 52. The introduction of strap between the gripper head and gripper bottom plate grounds out the gripper head which is tied into a circuit which includes the contact spring 77 that is in contact with a contact block 78 that is connected to the end of the bayonet 27. The grounding out of the gripper results in the positioning of the aforementioned solenoid operated valve to direct fluid to the rear end of the hydraulic cylinder 61 to move the bayonet longitudinally through the void in the closed-bottom pallet. When the bayonet is extended, the contact block engages a second contact spring 79 located adjacent the front end of the bayonet which maintains the control valve for the hydraulic cylinder in the preset position as long as the strap is located in the gripper. When the strap is removed from the gripper, the circuit including the strap and contact spring 79 is effective to change the position of the solenoid valve to direct fluid to the forward end of the hydraulic motor to retract the bayonet.

It remains to note that there is provided a limit switch 81 which permits the platen to compress the loaded pallet until such time as the bayonet 26 is extended. When the bayonet is extended, the limit switch 81 is closed to prevent any further downward movement of the platen to insure that the extended bayonet will not be damaged. After the bayonet has served its purpose and is retracted, limit switch 81 is automatically situated to re-apply downward pressure of the platen. There are also provided a number of other switching and relay mechanisms for controlling the operation of various pumps and valves, but the details of such arrangements are not important to the understanding of the present invention.

The methods of operation of the strapping apparatus for strapping open- and closed-bottom pallets are as follows:

When strapping an open-bottom pallet, the hydraulically operated shifter mechanism is actuated to move the chute curve 31 into registration with strap chute 18.

Also, at this time, the overhead assembly is moved downwardly to bring the platen into engagement with the load to compress it into a tight bundle. The feeder is then started to feed the strap through the upper chute (not shown) and vertical chute 18 into the lower chute 23. When the strap reaches the end of the lower chute 23, the feeder mechanism is automatically shut off. The operator then takes the strap from the inlet side of the feeder 16 and from the end of the lower chute and disposes these portions of the strap in overlapping relationship in the strapping tool 28. The strapping tool is then pivoted to move it into position adjacent the load and is operated to tension and seal the strap about the load. When the pallet is strapped, the platen is released and the pallet can be removed to a storage area.

When strapping closed-bottom pallets, the shifter mechanism 37 is operated to move the chute 33 and bayonet 26 into alignment with strap chute 18. The feeder 16 is then actuated to direct the strap through the upper strap chute and down the vertical strap chute 18 into the gripper 48. When the strap enters the gripper, a valve is moved to direct fluid to the hydraulic cylinder 61 to move the bayonet 26 longitudinally through the void in the pallet. The strap is then removed from the bayonet gripper and disposed in the strapping tool 28. When the strap is removed from the gripper, the hydraulic mechanism is actuated to return the bayonet to its retracted position to permit the strapped pallet to be removed from the strapping apparatus. After the bayonets are fully retracted, the platen is then moved downwardly to compress the load. The tool 28 is then operated to tension and seal the strap about the loaded pallet in the same manner as previously described with respect to the strapping of an open-bottom pallet. After strapping, the platen is moved upwardly to permit the removal of the pallet.

In order to graphically illustrate the control system for the bayonet apparatus, attention is directed to FIGURE 9. A brief description of the control circuit of FIGURE 9 is as follows:

When starting the machine, the foot switch energizes relay A, which relay then remains energized through contacts A1 and B1 to effect operation of the strap feeder motor 16 through contact B3.

If the bayonet is omitted, the strap enters the lower bayonet chute 23 and it eventually reaches the contact block which then becomes grounded electrically to energize relay B through relay A2. Relay B opens B1 to de-energize relay A to stop the strap feeder and relay B remains energized through B2 and C1 until the direction selector switch is turned to the up position.

If the bayonet is to be used and is switched into the chute system by the bayonet selector switch, the strap will eventually enter under the gripper 53 under the bayonet which then becomes grounded electrically by the strap. This energizes relay B through the contact bar 78 on the bayonet 26, contact spring 77 and relay A2. When this occurs, relay B opens B1 to de-energize relay A to stop the strap feeder and relay B closes B4 to operate the valve to propel the bayonet forward through the void in the pallet. This breaks the grounded connection at contact spring 77, but relay B remains energizezd through B2 and C1.

When the contact bar 78 connects the spring 79, relay C becomes energized through relay B3. Relay C then opens C1 to de-energize relay B and relay C remains energized through C2 until the strap is removed from the gripper and the grounded connection thereby is broken. The valve is returned and will, upon de-energizing, return the bayonet to the retracted position.

This diagram is merely schematic in nature and no effort is made, nor is it believed necessary, to illustrate the bayonet shifter controls, platen controls and controls for a multiple strap feeder, chutes and bayonets.

While the above specification has been directed to apparatus for securing a load to a pallet by means of a strap, it can be appreciated that the novel arrangements disclosed herein can be used for directing other ligatures across the bottom of a loaded pallet. For example, a rope could be used instead of a strap and other means could be employed to direct the bayonet gripper assembly across the bottom of the pallet. Such means could include a hydraulic assembly similar to that disclosed herein but one which would be manually actuated. Also, the particular invention disclosed is not limited to the use of a strapping machine of the type disclosed since where a different ligature is employed, there would necessarily be required other mechanisms for fixing the ligature in place about the loaded pallet.

Furthermore, the particular configuration of the bayonet and operating mechanism therefore can be other than that disclosed. In addition, the control mechanism and the pulley system employed are intended to be representative and not limiting.

It remains to note that while the specification has been directed to strapping a load to a pallet, the application of the invention is not limited or restricted to the specific details herein set forth. The novel bayonet mechanism could be used to tie one or more bundles together by extending a ligature through openings formed in the bundles to be tied.

I claim:

1. A strapping apparatus for strapping a loaded pallet including means for directing strap around the pallet which includes a strap chute assembly and a longitudinally extending bayonet, means at one end of the bayonet for gripping the strap from the strap chute, means for moving the bayonet back and forth across the bottom of the loaded pallet comprising a hydraulically positioned pulley assembly, a first band disposed around the pulley assembly which band is fixed at one end and is connected at its other end to the rear end of the bayonet, a second band extending around the pulley assembly which second band is fixed at one end and is connected at its other end to the front portion of the bayonet, whereby movement of the pulley assembly in one direction will move the bayonet across the bottom of the pallet and movement in the opposite direction will retract the bayonet, means for feeding strap through the strap chute into the bayonet means adapted to receive the strap, and a strapping tool for tensioning and sealing the strap in place about the loaded pallet.

2. A strapping apparatus having a platform for receiving a loaded pallet to be strapped, a main support frame, an overhead assembly including a platen, means for slidably supporting the overhead assembly relative to the main support frame, means for biasing the platen into engagement with the load for compressing the load into a tight bundle, means for directing strap around the loaded pallet including a strap chute assembly and a rigid longitudinally extending bayonet having a gripper head which receives the strap from the strap chute, a feeder supported by the overhead assembly and adapted to feed the strap through the chute into the gripper head, hydraulically operated means for moving the bayonet back and forth across the bottom of the pallet, means for controlling the operation of said hydraulically operated means, and a strapping tool pivotally mounted from the overhead assembly for tensioning and sealing the strap in place about the loaded pallet.

3. A mechanism for directing a ligature across the bottom of a load comprising a bayonet having means at one end thereof for receiving and holding the ligature, means for moving the bayonet back and forth across the bottom of the load comprising a hydraulically positioned pulley assembly, a first band which is fixed at one end and extends around the pulley assembly to the rear end of the bayonet and a second band which is fixed at one end and extends around the pulley assembly in a direction opposite to the first band to the front portion of the bayonet, whereby movement of the pulley assembly in one direction will move the bayonet across the bottom of the load and movement in the opposite direction will retract the bayonet.

4. A ligature guide system for directing a ligature around a load comprising a first ligature guideway disposed adjacent one side of the load, a second ligature guideway extending across the bottom of the load, a bayonet gripper assembly adapted to be in registration with the first ligature guideway for receiving and holding a ligature, means for moving the bayonet gripper assembly across the bottom of the load, and means for selectively interconnecting either the said second guideway or the bayonet gripper assembly with the first guideway.

5. A ligature guide system for directing a ligature around a load comprising a first ligature guideway disposed adjacent one side of the load, a second ligature guideway extending across the bottom of the load, a bayonet gripper assembly adapted to receive and hold the ligature, means for moving the gripper assembly across the bottom of the load, and hydraulically operated selector means for selectively interconnecting either the second guideway or the bayonet gripper assembly with the first guideway.

6. In a strapping device wherein a strap is guided along a guide chute, the combination comprising: a bayonet including a body member having a gripper head mounted thereon; means slidably supporting said bayonet for movement along an axis angularly displaced from the chute; first drive means positioning the gripper head adjacent the chute in position to receive a strap passing through said chute; and second drive means responsive to engagement of the strap with the gripper head for driving the bayonet along said axis to pull the strap away from the chute.

References Cited in the file of this patent

UNITED STATES PATENTS

| | | |
|---|---|---|
| 217,224 | Johnson | July 8, 1879 |
| 1,693,728 | Rainsford | Dec. 4, 1928 |
| 2,182,221 | Byl | Dec. 5, 1939 |
| 2,612,833 | MacChesney | Oct. 7, 1952 |
| 2,629,316 | Tillinghast | Feb. 24, 1953 |
| 2,754,117 | Ghormley | July 10, 1956 |
| 2,821,906 | Stoll | Feb. 4, 1958 |
| 2,831,422 | Black et al. | Apr. 22, 1958 |
| 2,959,118 | Hager | Nov. 8, 1960 |
| 2,985,098 | Winkler | May 23, 1961 |